(12) United States Patent
Liu

(10) Patent No.: US 10,018,725 B2
(45) Date of Patent: Jul. 10, 2018

(54) LIDAR IMAGING SYSTEM

(71) Applicant: Shanghai Jadic Optoelectronics Technology Co., Ltd., Shanghai (CN)

(72) Inventor: Ruilong Liu, Shanghai (CN)

(73) Assignee: Shanghai Jadic Optoelectronics Technology Co., Ltd., Shanghai (CN)

( * ) Notice: Subject to any disclaimer, the term of this patent is extended or adjusted under 35 U.S.C. 154(b) by 319 days.

(21) Appl. No.: 15/070,408

(22) Filed: Mar. 15, 2016

(65) Prior Publication Data

US 2016/0363669 A1  Dec. 15, 2016

(30) Foreign Application Priority Data

Jun. 12, 2015 (CN) .......................... 2015 1 0325310

(51) Int. Cl.

| | | |
|---|---|---|
| G01C 3/08 | (2006.01) | |
| G01S 17/89 | (2006.01) | |
| G01S 17/32 | (2006.01) | |
| G01S 17/58 | (2006.01) | |
| G01S 7/481 | (2006.01) | |
| G01S 7/499 | (2006.01) | |

(52) U.S. Cl.
CPC ............ *G01S 17/89* (2013.01); *G01S 7/4812* (2013.01); *G01S 7/4815* (2013.01); *G01S 7/499* (2013.01); *G01S 17/325* (2013.01); *G01S 17/58* (2013.01)

(58) Field of Classification Search
CPC combination set(s) only.
See application file for complete search history.

(56) References Cited

U.S. PATENT DOCUMENTS

| | | | |
|---|---|---|---|
| 8,836,922 B1 | 9/2014 | Pennecot et al. | |
| 2009/0086016 A1* | 4/2009 | Su ...................... | H04N 13/0434 13/434 |
| 2010/0182572 A1* | 7/2010 | Huang ............... | G02B 27/1066 353/20 |
| 2010/0296060 A1* | 11/2010 | Huang ................ | G03B 21/142 353/20 |
| 2011/0029049 A1* | 2/2011 | Vertikov ............ | A61B 5/14532 607/104 |

* cited by examiner

*Primary Examiner* — Samantha K Abraham
(74) *Attorney, Agent, or Firm* — Muncy, Geissler, Olds & Lowe, P.C.

(57) ABSTRACT

A LIDAR imaging system (90) includes: an illumination source block (100) having at least one illumination source (110) for emitting at least one polarized illumination beam (20) of first polarization with wavelengths in a first wave length range (21); an optical engine core (200) having a first polarized beam splitter panel (210); a quarter wave retarder panel (230) configured between the external image object (900) and the optical engine core (200); and a first imaging block (300) having a plurality of first illumination detectors (310). The imaging system is more compact and ensures optical alignment between the radiation sources and the detectors. Moreover, the polarized illumination beams and the retarded reflection beams do not interfere with each other though transiting along the same axis, thus improving the imaging quality of the imaging system.

23 Claims, 6 Drawing Sheets

LIDAR IMAGING SYSTEM

CROSS-REFERENCES TO RELATED APPLICATIONS

This application claims the priority of Chinese patent application number 201510325310.5, filed on Jun. 12, 2015, the entire contents of which are incorporated herein by reference.

TECHNICAL FIELD

The invention is related to the field of light detection and ranging (LIDAR) imaging systems, and more particularly to a LIDAR imaging system for spatial volumetric imaging applications.

BACKGROUND

LIDAR imaging systems, which are capable of high-speed 3D imaging, are widely used in for example autonomous vehicles, 3D virtual reproduction systems, 3D printing and aerial photography. It is highly desired to articulately incorporate and spatially integrate all the critical components of a LIDAR imaging system including laser sources, illumination manipulation optics and detectors, into a highly precision, compact configuration for expanding such a powerful system to a broad range of applications.

The LIDAR system developed by Google (U.S. Pat. No. 8,836,922B1) is a typical system currently used for commercial autonomous vehicles. The operation principle of the system is shown in FIG. 1. The optical engine of the LIDAR system includes a plurality of light sources 222, which are configured to emit pulsed laser beams. The pulsed laser beams are driven to form beams 204 through a tiny exit aperture 226 and the beams 204 propagate in a transmit path that extends through a shared space 240 towards a lens 250. The lens 250 collimates the beams 204 to provide collimated light beams, then the collimated light beams transmit to and are reflected by an external object 900. After transmitting through the lens 250 again, the collimated light beams form focused beams 208 which transmit into the shared space 240 and are reflected by the wall 244 towards a plurality of detectors 232. The beams are then detected by the plurality of detectors 232 to obtain the pulse signal intensity and the time difference data relative to the pulsed laser beams to obtain the information about distances and orientations of the external object.

Though as an integrated LIDAR system of such, the LIDAR imaging device in the prior art disclosed in U.S. Pat. No. 8,836,922B1 is noticed with certain conflicting optical features as shown in FIG. 1. Among many of optical and systematic drawbacks, the wall 244 is "broken" or interrupted with an exit aperture 226 which causes direct interference to reflection of the focused light 208; however, the disclosed optical configuration mandates such exit aperture 226 for guiding the beams 204 through the shared space 240 to transmit through the device for illuminating an external object to image. Such drawbacks are inherited by the fundamental architect of such an optical and imaging system yet to be redesigned and integrated.

SUMMARY OF THE INVENTION

The present invention is directed to the provision of a LIDAR imaging system for imaging an external image object outside thereof, which is capable of addressing the issues of optical defects of the imaging system in the prior art.

To overcome the above-mentioned issues, the present invention provides a LIDAR imaging system for imaging an external image object outside thereof, the LIDAR imaging system includes: an illumination source block having at least one illumination source, the at least one illumination source emitting at least one polarized illumination beam of first polarization with wavelengths in a first wave length range; an optical engine core having a first polarized beam splitter; a quarter wave retarder panel configured between the external image object and the optical engine core; and a first imaging block having a plurality of first detectors; in a temporary sequence, each of the at least one polarized illumination beam emitted by the at least one illumination source either transits through or is reflected by the first polarized beam splitter panel and further transits through the quarter wave retarded panel with a first 45-degree polarization rotation as a retarded illumination beam, the retarded illumination beam illuminates the external image object, the external image object generates multiple reflected beams upon illumination of the retarded illumination beam, at least one of the multiple reflected beams transits through the quarter wave retarded panel with a second 45-degree polarization rotation as a retarded reflection beam having opposite polarization to the first polarization, the retarded reflection beam is either reflected by or transits through the first polarization beam splitter panel, and at least one of the plurality of first detectors in the first imaging block receives and detects radiation of the retarded reflection beam.

Preferably, the polarized illumination beam confronts in an approximately 45 degree angle and to transmit through the polarized beam splitter panel and then confronts the quarter wave retarder panel in an approximately 90 degree angle.

Preferably, the polarized illumination beam confronts in an approximately 45 degree angle and reflected by the polarized beam splitter panel and then confronts the quarter wave retarder panel in an approximate 90 degree angle.

Preferably, each of the at least one illumination source includes an illumination beam catheter and a light generator, the illumination beam catheter is an optical fiber optically connected with the radiation generator.

Preferably, each of the at least one illumination source includes an illumination beam collimator and the illumination beam collimator configured to collimate the polarized illumination beam.

Preferably, the illumination source block includes an illumination polarizer panel positioned between the optical engine core and the at least one illumination source, the illumination polarizer panel configured to polarize illumination beams generated from the at least one illumination source as the polarized illumination beams with the first polarization.

Preferably, the LIDAR imaging system further includes a first focus lens set configured between the quarter wave retarder panel and the external image object, the multiple reflected beams are refracted by the first focus lens and confront the quarter wave retarded panel in a 90 degree angle.

Preferably, the LIDAR imaging system further includes a plurality of second radiation waveguides positioned between the external image object and the first focus lens set, each of the plurality of second waveguides is in parallel with and configured to transmit a single retarded illumination beam.

Preferably, each of the multiple reflected beams includes a primary reflection beam defined as one with highest intensity of reflection and a plurality of secondary reflection beams defined as ones with relatively lower intensity of reflection.

Preferably, the first detectors are semiconductor photodiodes.

Preferably, the semiconductor photodiodes are avalanche photodiodes.

Preferably, the first detectors are grating diodes.

Preferably, the LIDAR imaging system further includes a first polarization filter panel configured between the first imaging block and the optical engine core, the first polarization filter panel is configured to transmission of radiation of the first polarization with wavelengths in the first wave length range.

Preferably, the optical engine core further includes a second polarized beam splitter panel, the second polarized beam splitter panel has opposite polarization to the first polarization with wavelengths in the first wave length range and is spatially configured perpendicular to the first polarized beam splitter panel.

Preferably, the LIDAR imaging system further includes a second imaging block having a plurality of second detectors, the second imaging block receives and detects secondary radiation originated of wavelengths in a second wave length range from the external image object and transmitted through the first polarized beam splitter panel and the second polarized beam splitter panel, the first wave range and the second wave length range have no overlap over an electromagnetic spectrum.

Preferably, the LIDAR imaging system further includes a band pass filter penal configured between the optical engine core and the second imaging block, the band pass filter panel substantially blocks electromagnetic radiation of wavelengths outside the second wave length range.

Preferably, the LIDAR imaging system further includes a second focus lens configured between the optical engine core and the second imaging block, the secondary radiation is refracted by the second focus lens and is guided towards the second detectors.

Preferably, the second imaging block includes a visible light image sensor configured to detect visible light and synchronously capture a two-dimensional image of the external image object.

Preferably, the first wave length range is outside a visible portion of the electromagnetic spectrum and the second wave length range is the visible portion of the electromagnetic spectrum.

Preferably, the first wave length range is either in an ultra violet range of electromagnetic radiation with wavelength shorter than 280 nm but longer than 1 nm, or in a near infra-red range with wavelengths between 750 nm to 2500 nm.

Preferably, the illumination source block further includes a rocking plate and a curved source prism, the at least one illumination source is mounted onto the rocking plate, the rocking plate is driven to rock rotate the at least one illumination source around a rocking axis to swing the illumination beams, the illumination beams is being refracted by the source prism, the illumination beams upon refraction thereof confronts the first polarization beam splitter panel in a 45 degree angle.

Preferably, the LIDAR imaging system further includes a plurality of first radiation waveguides configured between the external image object and the quarter wave retarder panel, each of the plurality of first radiation waveguide is configured parallel to and transmits one of the polarized illumination beams.

Preferably, the LIDAR imaging system further includes a plurality of third radiation waveguides each positioned in correspondence with one of the first detectors to block incident radiation which is not perpendicular to the first detectors.

The method of operating the LIDAR imaging system of the present invention directs a plurality of pulsed polarized illumination beams through a first polarized beam splitter panel placed at an approximately 45 degree angle, a quarter wave retarder panel and a first focus lens set to form a plurality of first retarded illumination beams, the first retarded illumination beams illuminate the external image object so that the object generates multiple reflected beams, at least one of the reflected beams transit through the first focus lens set, the quarter wave retarder panel and the first polarized beam splitter to form second retarded reflection beams having polarization just opposite to the first polarization, the second retarded reflection beams further transit towards the first detectors and are detected by the first detectors so that orientations and distances to the external object are obtained. The imaging system of the present invention is more compact and ensures optical alignment between the radiation sources and the detectors. Moreover, the polarized illumination beams and the retarded reflection beams do not interfere with each other though transiting along the same axis, thus improving the imaging quality of the imaging system.

DETAILED DESCRIPTION

The following detailed description depicts various features and functions of the disclosed LIDAR optical systems with reference to the accompanying figures in which similar symbols identify similar components, unless context explains otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

In a first aspect, the present invention directs a plurality of pulsed polarized illumination beams through a first polarized beam splitter panel placed at an approximately 45 degree angle, a quarter wave retarder panel and a first focus lens set to form a plurality of first retarded illumination beams, the first retarded illumination beams illuminate the external image object so that the object generates multiple reflected beams, at least one of the reflected beams transit through the first focus lens set, the quarter wave retarder panel and the first polarized beam splitter to form second retarded reflection beams having polarization just opposite to the first polarization, the second retarded reflection beams further transit towards the first detectors and are detected by the first detectors so that orientations and distances to the external object are obtained. In another aspect, multiple illumination sources are driven to emit multiple polarized illumination beams, individual arrival times and/or individual intensities of the retarded reflection beams corresponding to the polarized illumination beams are detected by the first detectors. The imaging system of the present invention is more compact and ensures optical alignment between the radiation sources and the detectors. Moreover, the polarized illumination beams and the retarded reflection beams do not interfere with each other though transiting along the same axis, thus improving the imaging quality of the imaging system.

The structure of a LIDAR imaging system 90 of the present invention is described in detail below in conjunction with FIGS. 2-6. Those skilled in the art shall understand that the LIDAR imaging system 90 of FIGS. 2-6 is drawn not to practical scales but closely according to a Cartesian spatial system 10 with the first, second and third Cartesian axes, 11, 12 and 13, mutually perpendicular to each other, to systematically illustrate the critical features of the LIDAR imaging system 90 and their correlation and function from the top view associated with the third Cartesian axis 13.

Figure 1:
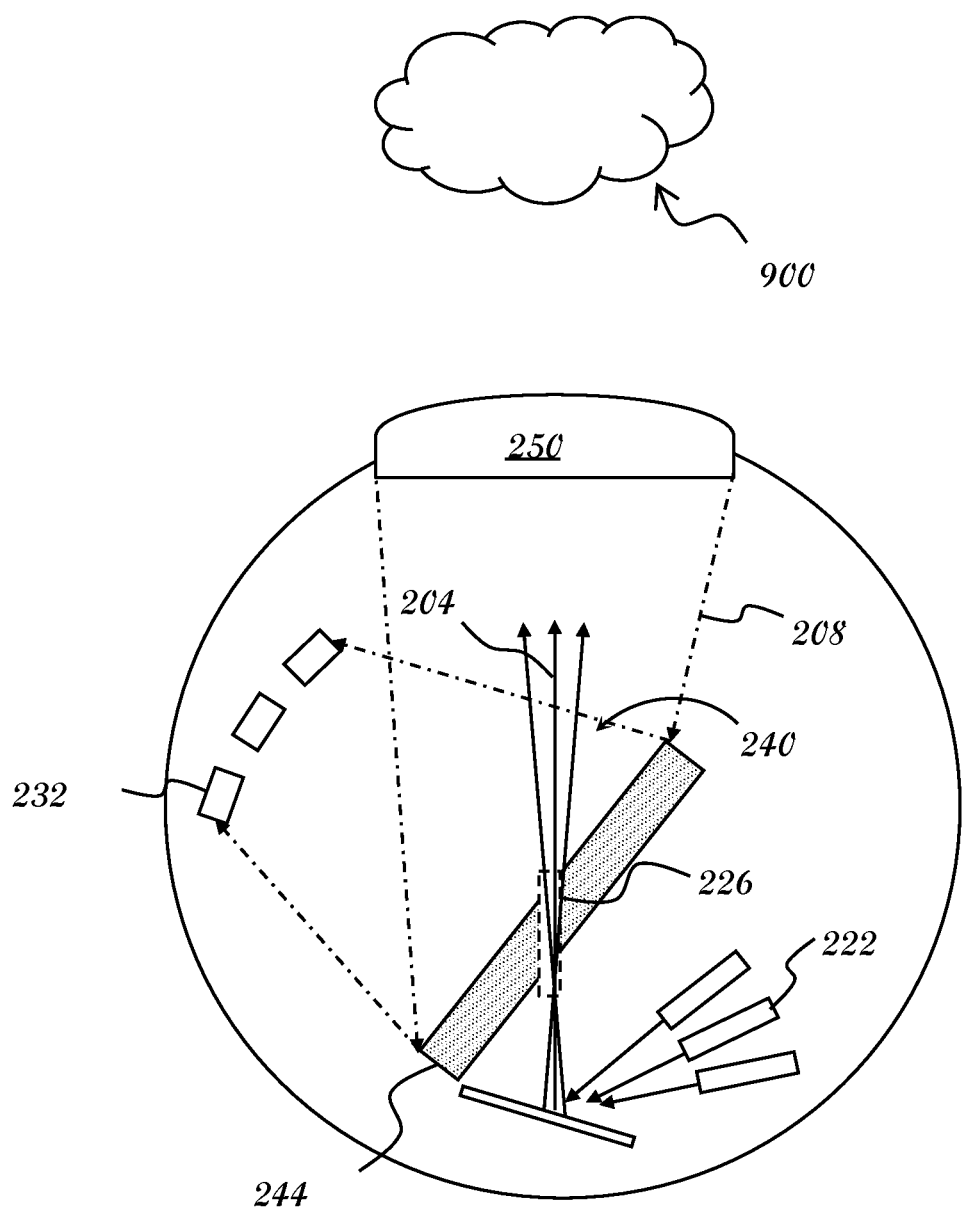
FIG. 1 is a cross-section view of an optical engine of a LIDAR imaging system according to the prior art.
Figure 2:
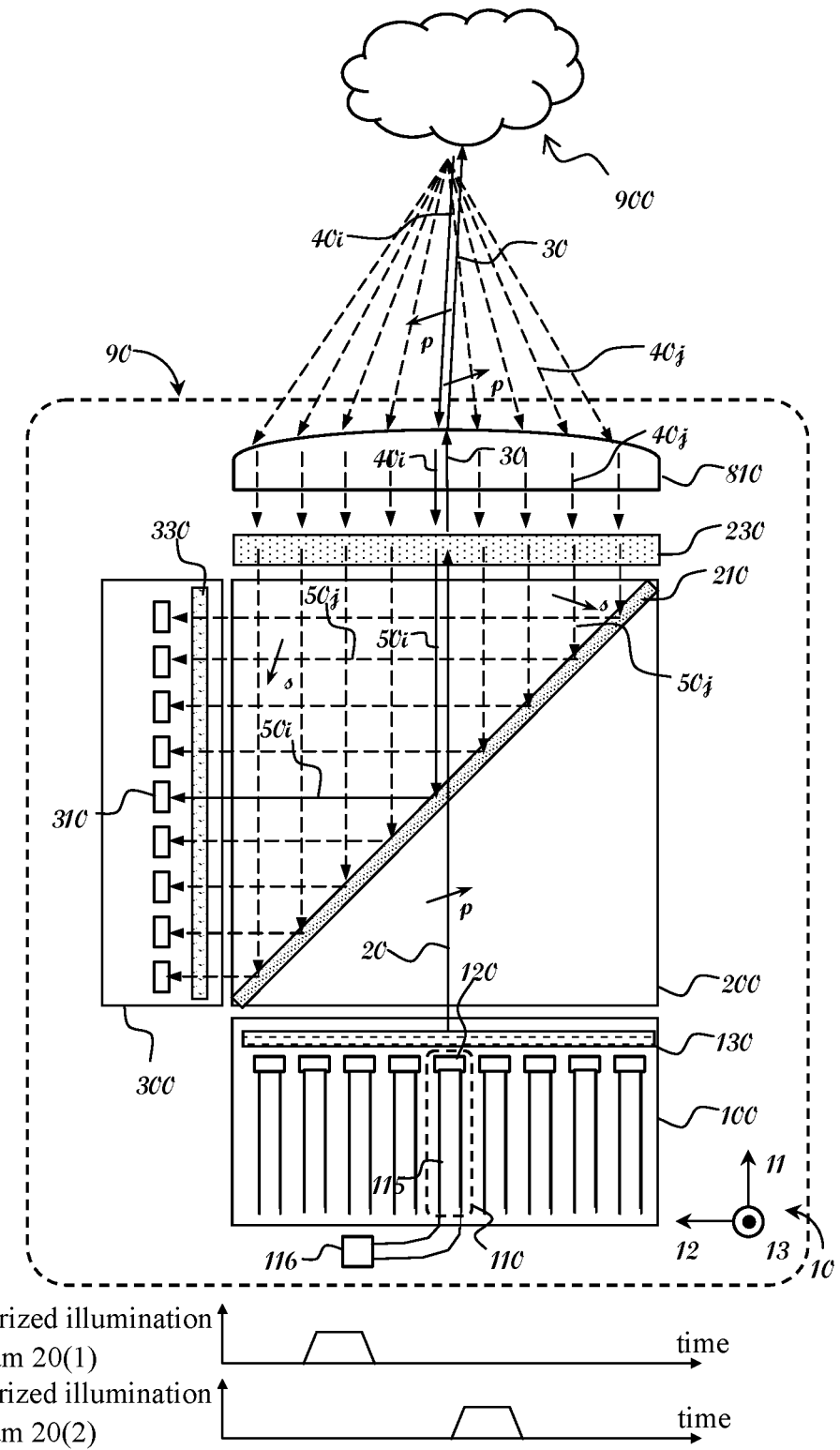
FIG. 2 is a cross-section view of a LIDAR imaging system according to one embodiment of the disclosed invention.

As an exemplary configuration of this embodiment shown in FIG. 2, the LIDAR imaging system 90 comprises an illumination source block 100, an optical engine core 200, a quarter wave retarder panel 230, a first focus lens set 810 and a first imaging block 300. The illumination source block 100 contains a plurality of illumination sources 110 optically aligned parallel to the first Cartesian axis 11 but perpendicular to the third Cartesian axis 13. The optical engine core 200 comprises a first polarized beam splitter panel 210, wherein the first polarized beam splitter panel 210 is configured parallel to the third Cartesian axis 13 and forms a roughly 45 degree angle with the first Cartesian axis 11 and the second Cartesian axis 12. The first polarized beam splitter panel 210 is configured for allowing radiation of first polarization with wavelengths in a first wave length range 21 to transmit through. The quarter wave retarder panel 230 and the first focus lens set 810 are successively arranged between the optical engine core 200 and the external image object 900 and are both positioned on the opposite side of the optical engine core 200 to the illumination source block 100. The quarter wave retarder panel 230 is configured perpendicular to the first Cartesian axis 11 and parallel to the second and the third Cartesian axes 12 and 13 and so is the first focus lens set 810. The first imaging block 300 is configured perpendicular to the second Cartesian axis 12 and parallel to the first and the third Cartesian axes 11 and 13. The first imaging block 300 contains a plurality of first detectors 310. And in the first imaging block 300, a first polarized filter panel 330 is configured between the first detectors 310 and the optical engine core 200. The first polarized filter panel 330 is configured to block radiation of first polarization with wavelengths in the first wave length range 21 from transmission. It should be noted that the first focus lens set 810 and the first polarized filter panel 330 are preferably employed but can be either or both omitted in some embodiments of the present invention. LIDAR imaging systems 90 without the first focus lens set 810 or the first polarized filter panel 330 can still achieve the aforementioned technical effects, though the effects may not be as good. Moreover, the first imaging block 300 may optionally include a plurality of focus lenses positioned between the first detectors 310 and the optical engine core 200, such that the retarded illumination beams 30 transmit perpendicularly to the first detectors 310. Furthermore, the LIDAR imaging system 90 may optionally include a plurality of third radiation waveguides 350 each positioned in correspondence with one of the first detectors 310 to block incident radiation which is not perpendicular to the first detector 310.

With continued reference to FIG. 2, the illumination source 110 includes an illumination beam catheter 115 and a light generator 116. The illumination beam catheter 115 is an optical fiber 115 optically connected to the light generator 116. Each of the illumination sources 110 includes an illumination beam collimator 120 and the illumination beam collimator 120 substantially collimates the polarized illumination beams 20. The illumination source 110 further includes an illumination polarizer panel 130 positioned between the optical engine core 200 and the illumination source 110. The illumination polarizer panel 130 polarizes all illumination beams generated from the illumination sources 110 as the polarized illumination beams 20 with first polarization. It should be noted that the illumination beam catheter 115 and the illumination beam collimator 120 are preferably employed but can be either or both omitted in some embodiments of the present invention. LIDAR imaging systems 90 without illumination beam catheter 115 or the illumination beam collimator 120 can still achieve the aforementioned technical effects, though the effects may not be as good.

The operation principle of the LIDAR imaging system 90 of the present invention is as follows: the illumination sources 110 are driven to emit polarized illumination beams 20 of first polarization with wavelengths in a first wave length range 21 along the first Cartesian axis 11. The polarized illumination beams 20 first confront in an approximate 45 degree angle and to transmit through the polarized beam splitter panel 210 and then confront in an approximate 90 degree angle and to transmit through the quarter wave retarder panel 230 towards the external image object 900 outside the LIDAR imaging system 90. The quarter wave retarder panel 230 induces a first 45-degree rotation of polarization to the polarized illumination beams 20 which results in retarded illumination beams 30 continuously transporting along the first Cartesian axis 11 towards the external image object 900 after transmitting through the first focus lens set 810.

Multiple reflection beams 40 are generated at one point on the surface of the external image object 900 upon incidence of the retarded illumination beams 30 and then guided by the first focus lens set 810 to confront in an approximate 90 degree angle and to transmit through the quarter wave retarder panel 230 again which induces a second 45-degree rotation of polarization on the reflection beams 40, resulting in retarded reflection beams 50 having second polarization just opposite the first polarization. The retarded reflection beams 50 confront in an approximate 45 degree angle and then, are reflected by the first polarized beam splitter 210 towards the first imaging block 300. At least one of the first illumination detectors 310 in the first imaging block 300 receive and detect the radiation of the retarded reflection beams 50, and detect the individual arrival times and/or individual intensities of the retarded reflection beams 50 relative to the corresponding polarized illumination beam 20, thus obtaining the spatial information of the external image object 900.

In the embodiment shown in FIG. 2, the illumination source block 100 and the quarter wave retarder panel 230 are positioned on two opposite sides of the optical engine core 200. However, in other embodiments of the present invention, the illumination source block 100 may alternatively be positioned in adjacent to the quarter wave retarder panel 230. As shown in FIG. 2, the first imaging block 300 and the illumination source block 100 may switch their positions, and the direction of polarization of the first polarized beam splitter 210 may be rotated by 90 degree, such that the polarized illumination beam 20 is reflected by and the retarded reflection beams 50 may transmit through the first polarized beam splitter 210. In such embodiment, the illumination source block 100 and the quarter wave retarder panel 230 may be positioned on two adjacent sides of the optical engine core 200; the polarized illumination beam 20 confronts in an approximate 45 degree angle and then, is reflected by the polarized beam splitter panel 210 towards the quarter wave retarder panel 230. The first imaging block 300 may be positioned for example on the opposite side of the optical engine core 200 to the quarter wave retarder panel 230 and in alignment with the quarter wave retarder panel 230, such that the first imaging block 300 detects the retarded reflection beams 50 transmitting through the polarized beam splitter panel 210. Other optical configurations may be the same as shown in FIG. 2 and therefore are not repeatedly described herein.

Regarding the operation principle of the LIDAR imaging system 90, it should be noted that among the multiple reflection beams 40, a primary reflection beam 40i is defined as the one with highest intensity of reflection and secondary reflection beams 40j are as the rest of the multiple with relatively lower intensity of reflection. Similarly, the retarded reflection beams 50 include a primary retarded reflection beam 50i and secondary retarded reflection beams 50j which correspond to the primary reflection beam 40i and the secondary reflection beams 40j respectively. The combination of spatial and temporary information on the primary reflection beam 40i and the secondary reflection beams 40j, as being eventually detected through multiple of the first detectors 310 of the first imaging block 300 by detecting the primary retarded reflection beam 50i and the secondary retarded reflection beams 50j, serves the basis for reconstructing the volumetric features of the external object being imaged.

Referring to FIG. 2, in one disclosed method for operating the LIDAR imaging system 90, one of the illumination sources 110 is driven to emit one polarized illumination beam 20 of first polarization with wavelengths in a first wave length range 21 along the first Cartesian axis 11, as marked as the polarization illumination beam 20(1) in an earlier pulse as shown in FIG. 2. Retarded reflection beams 50 are generated from the polarization illumination beam 20(1) following the operation principle as mentioned above. The plurality of first detectors 310 in the first imaging block 300 detect the individual arrival times and/or individual intensities of the retarded reflection beams 50 relative to the polarization illumination beam 20(1), thus completing detection of the retarded reflection beams 50 upon the earlier pulse.

Afterwards, an alternative one of the illumination sources 110 is activated, as marked as the polarization illumination beam 20(2) in a later pulse shown in FIG. 2, to emit another polarized illumination beam 20 of first polarization along the first axis 11 and thus, detection of the retarded reflection beams 50 upon the individual arrival times and/or individual intensities of the polarization illumination beam 20(2) of this later pulse is accomplished by the first detectors 310 in the same manner as described above.

Through repeated steps of detection of a plurality of polarization illumination beams 20 in the manner as described above, a time sequential set of geometric mapping data are collected on the radiation intensity and arrival time at the imaging block 300 relative to a temporary sequence of a plurality of pulses corresponding to the plurality of time-divided polarized illumination individually emitted by the illumination sources 110.

Figure 3:
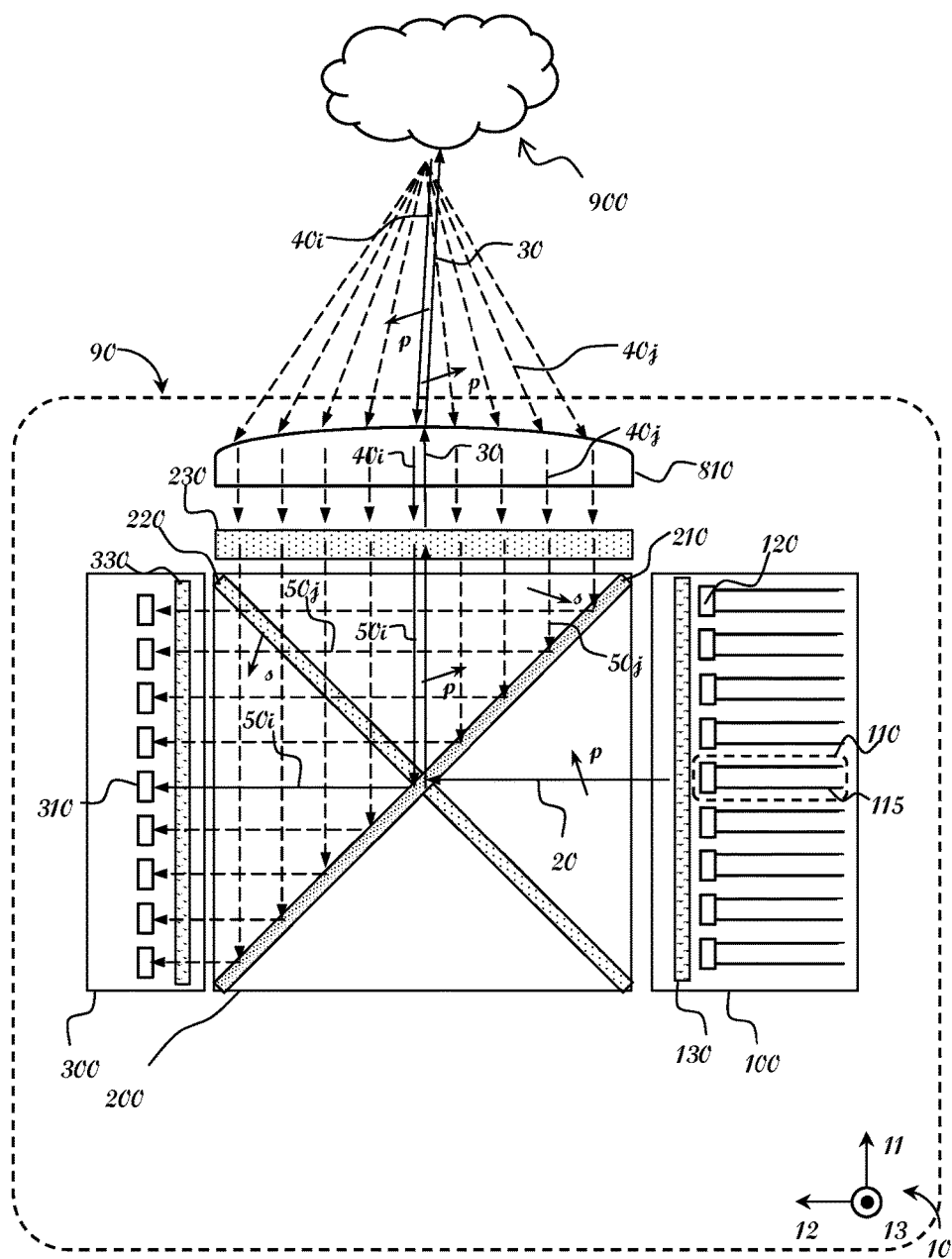
FIG. 3 is a cross-section view of a LIDAR imaging system according to one extended embodiment from FIG. 2.

Another embodiment of the present invention is shown in FIG. 3, which is a cross-section view of a LIDAR imaging system 90 according to one extended embodiment from FIG. 2. Herein the optical engine core 200 further comprises a second polarized beam splitter 220, wherein the second polarized beam splitter panel 220 is perpendicular to the first polarized beam splitter panel 210, and is configured for allowing the radiation of second polarization that is opposite to the first polarization with wavelengths in the first wave length range 21 to transmit through. The second polarized beam splitter panel 220 is configured also parallel to the third Cartesian axis 13 and in a roughly 45-degree angle with the first and second Cartesian axes 11 and 12, while the illumination source block 100 is alternatively configured face-to-face opposite to the first imaging block 300 along the second Cartesian axis 12. The polarized illumination beam 20 of first polarization emitted from one illumination source 110 is first reflected alternatively by the second polarized beam splitter 220 towards the quarter wave retarder panel 230 and the first focus lens set 810. The rest of optical paths and evolution processes for the illumination beams 20, the retarded illumination beams 30 and the reflection beams 40 are the same as described above and shown in FIG. 2. The retarded reflection beams 50 are transmitted through the second polarized beam splitter panel 220 and are reflected by the first polarized beam splitter panel 210 towards the first imaging block 300.

Figure 4:
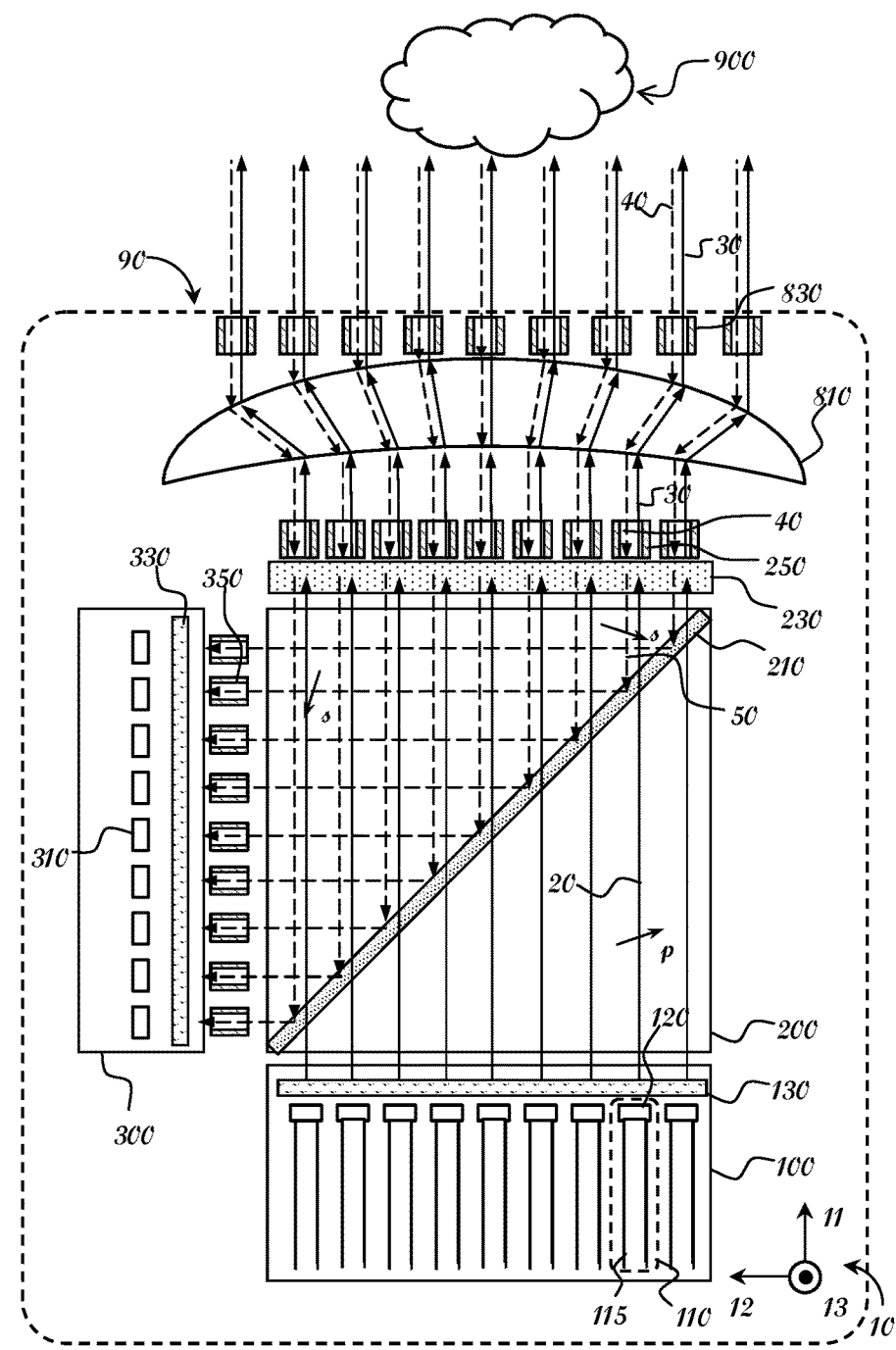
FIG. 4 is a cross-section view of a LIDAR imaging system according to another extended embodiment from FIG. 2.

FIG. 4 is a cross-section view of a LIDAR imaging system 90 according to another extended embodiment from FIG. 2. Herein the LIDAR imaging system 90 further comprises a plurality of first radiation waveguides 250 positioned between the external image object 900 and the quarter wave retarder panel 230, wherein each first radiation waveguide 250 is configured parallel to and transmits a single polarized illumination beam 30. Alternatively, the LIDAR imaging system 90 may further comprise a plurality of second radiation waveguides 830 positioned between the external image object 900 and the first focus lens set 810, wherein each second radiation waveguide 250 is configured for substantially blocking reflected radiation from the external image object 900 not parallel to the retarded illumination beams 30. Furthermore, the LIDAR imaging system 90 comprises a plurality of third radiation waveguides 350 positioned between the optical engine core 200 and the first imaging block 300, wherein each third radiation waveguide 350 is configured perpendicular to one correspondent first detector 310, substantially blocks incident radiation not perpendicular to the first detector 310.

As shown in FIG. 4, in another disclosed method for applying the LIDAR imaging system 90, multiple of the illumination sources 110 simultaneously emit the individual polarized illumination beams 20 in pulses as marked as the polarized illumination beams 20(1), 20(2) and so on shown in FIG. 4, each being collimated along the first Cartesian axis 11 and transmitting through the first polarized beam splitter panel 210 towards the quarter wave retarder panel 230. The quarter wave retarder panel 230 induces a first 45-degree rotation of polarization to the incident polarized illumination beams 20 as the retarded illumination beams 30, each of which would transit through one first radiation waveguide 250 optically aligned with the correspondent illumination source 110. Each retarded illumination beam 30 is refracted by the first focus lens set 810 and further transmits through the correspondent second radiation waveguide 830 to illuminate the external image object 900. From each retarded illumination beam 30, only one of all the reflected beams 40 by the external image object 900 which collides in parallel with, but transmits in the opposite direction to, each retarded illumination beam 30 is guided by and allowed to transit through the correspondent second waveguide 830. Those particular reflected beams 40 are thus wave guided individually through the correspondent second radiation waveguides 830 towards and thus refracted by the first focus lens set 810 before further being wave guided individually by the correspondent first radiation waveguides 250. Those particular reflected beams 40 are further imposed with a second 45-degree rotation of polarization by the quarter wave retarder panel 230 as the retarded reflection beams 50 with opposite polarization to first polarization in opposite but parallel direction to the first Cartesian axis 11 which are further reflected by the first polarization beam splitter panel 210 along the second Cartesian axis 12 towards the first imaging block 300. Those particular retarded reflection beams 50 are optionally polarization filtered by the first polarization filter panel 330 and further wave guided individually by the correspondent third radiation waveguides 350 before individually received and detected by the correspondent first detectors 310. Those first detectors 310 detect individual arrival times of the correspondent retarded reflection beams 50 with second polarization opposite to first polarization relative to this pulses or/and their individual intensities.

Figure 5:
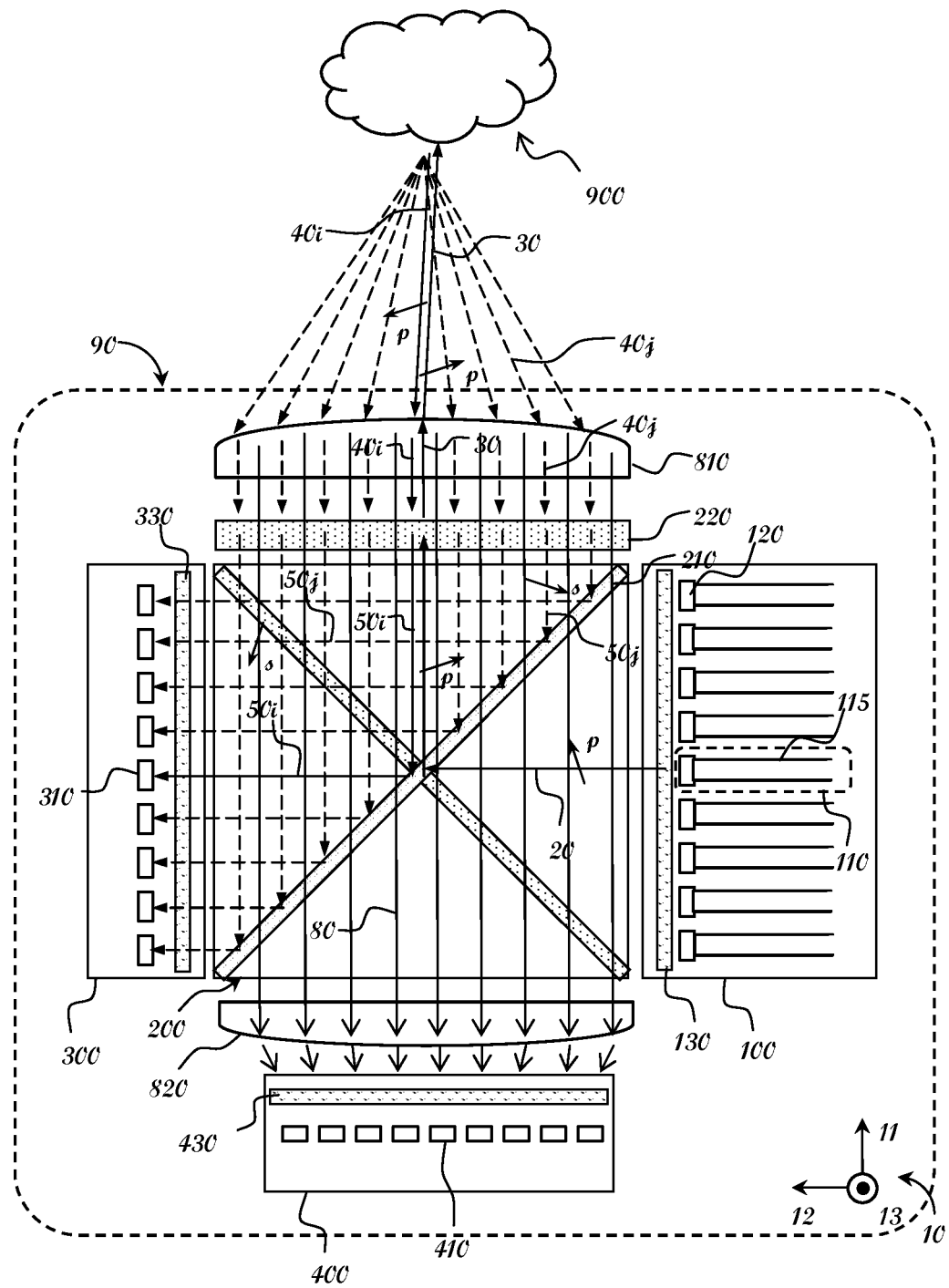
FIG. 5 is a cross-section view of a LIDAR imaging system according to an extended embodiment of the disclosed invention from FIG. 3.

FIG. 5 is a cross-section view of a LIDAR imaging system 90 according to an extended embodiment of the disclosed invention from FIG. 3. Herein the LIDAR imaging system 90 further includes a second imaging block 400 which includes multiple second detectors 410. The second imaging block 400 is configured to receive and detect secondary electromagnetic radiation 80 of wavelengths in a second wave length range 22 which has no overlap with the first wave length range 21, wherein the secondary electromagnetic radiation 80 is generated by or transported from the external image object 900 and transmits through the first polarization beam splitter panel 210 and the second polarization beam splitter panel 220. It should be noted that the secondary electromagnetic radiation 80 is formed by light reflected by the external image object 900 when the object 900 is illuminated by a light source outside of the LIDAR imaging system 90. In addition, the second imaging block 400 further includes a band pass filter penal 430 between the optical engine core 200 and the second detectors 410, wherein the band pass filter panel 430 is configured to produce blockage to electromagnetic radiation of wavelengths outside the second wave length range 22. The LIDAR imaging system 90 further includes a second focus lens 820 configured between the optical engine core 200 and the second imaging block 400. The secondary electromagnetic radiation 80 is refracted by the second focus lens 820 and is guided towards the second detectors 410. The first wave length range 21 has electromagnetic wave spectrum outside the visible spectrum, for example, the first wave length range 21 is either in the ultra violet (UV) range of electromagnetic radiation with wavelength shorter than 280 nm but longer than 1 nm, or more preferably in the near infra-red (NIR) range with wavelengths between 750 nm to 2,500 nm such that the second wave length range 22 is chosen as the visible range. Besides, the second imaging block 400 includes a visible light image sensor (not shown), which is configured to detect visible light and synchronously capture a two-dimensional image of the external image object 900.

Typically, the first detectors 310 and/or the second detectors 410 in the LIDAR imaging system 90 are chosen as semiconductor photodiodes, for example, avalanche photodiodes capable of high-speed detection of weak light irradiation. Besides, the first detectors 310 and/or the second detectors 410 may alternatively be photo gates.

Figure 6:
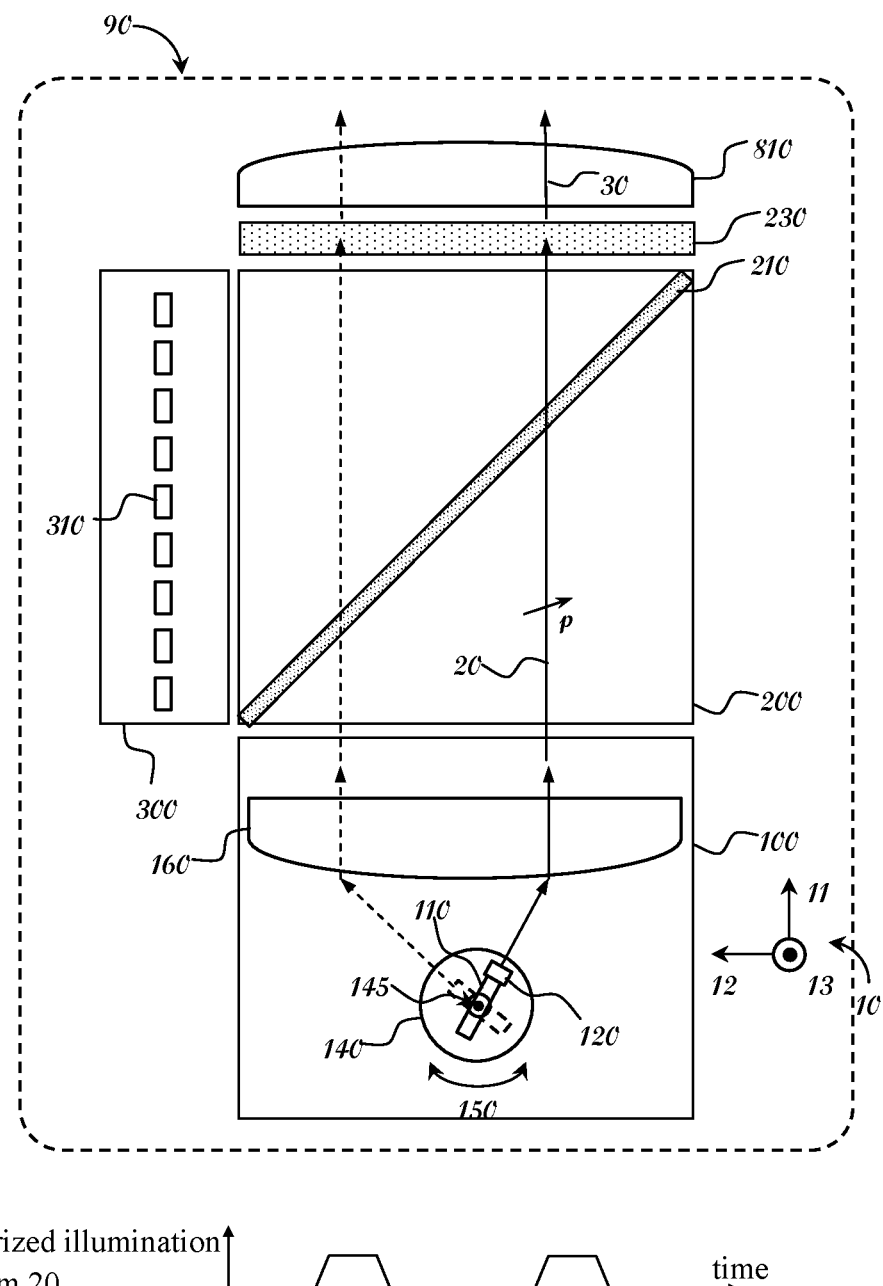
FIG. 6 is a cross-section view of a LIDAR imaging system according to another embodiment of the disclosed invention.

FIG. 6 is a cross-section view of a LIDAR imaging system 90 according to another embodiment of the disclosed invention. Herein the illumination source block 100 further comprises a curved source prism 160 and a rocking plate 140 onto which at least one illumination source 110 is mounted. The rocking plate 140 is driven to rock rotate the illumination source 110 around a rocking axis 145 to swing the illumination source 110. While being swung rapidly, the illumination source 110 emits a temporary series of polarized illumination beams 20 in pulse which transmit in different spatial paths which all confront the source prism 160. Upon refraction by the source prism 160, all the temporary series of polarized illumination beams 20 further transmit in parallel along the first Cartesian axis 11 and confront the first polarization beam splitter panel 210 in an approximate 45 degree angle. The rest of optical paths and evolution processes for the illumination beams 20, the retarded illumination beams 30, the reflection beams 40 and the retarded reflection beams 50 are the same as described above and shown in FIG. 2. In the similar manner, the first imaging block 300 is operated for detecting reflected radiation from an external image object 900 as described above in FIG. 2.

Although the first illumination source 110 and the polarized illumination beams 20 are time-modulated by using pulsed signals in the method of operating the LIDAR imaging system 90 of the present invention described above, it should be noted that other time-modulation methods can also be used, such as using continuous-wave modulation signals of sine or rectangular waves.

In summary, the method of operating the LIDAR imaging system of the present invention directs a plurality of pulsed polarized illumination beams through a first polarized beam splitter panel placed at an approximately 45 degree angle, a quarter wave retarder panel and a first focus lens set to form a plurality of first retarded illumination beams, the first retarded illumination beams illuminate the external image object so, that the object generates multiple reflected beams, at least one of the reflected beams transit through the first focus lens set, the quarter wave retarder panel and the first polarized beam splitter to form second retarded reflection beams having polarization just opposite to the first polarization, the second retarded reflection beams further transit towards the first detectors and are detected by the first detectors so that orientations and distances to the external object are obtained. The imaging system of the present invention is more compact and ensures optical alignment between the radiation sources and the detectors. Moreover, the polarized illumination beams and the retarded reflection beams do not interfere with each other though transiting along the same axis, thus improving the imaging quality of the imaging system.

It is apparent that those skilled in the art can make various changes and modifications without departing from the spirit and scope of the present invention. Therefore, it is intended that all such changes and modifications fall within the scope of the invention as defined by the appended claims and their equivalents.

What is claimed is:

1. A LIDAR imaging system (90) for imaging an external image object (900) outside thereof comprises: an illumination source block (100) having at least one illumination source (110), the at least one illumination source (110) emitting at least one polarized illumination beam (20) of first polarization with wavelengths in a first wave length range (21); an optical engine core (200) having a first polarized beam splitter (210); a quarter wave retarder panel (230) configured between the external image object (900) and the optical engine core (200); and a first imaging block (300) having a plurality of first detectors (310); wherein in a temporary sequence, each of the at least one polarized illumination beam (20) emitted by the at least one illumination source (110) either transits through or is reflected by the first polarized beam splitter panel (210) and further transits through the quarter wave retarded panel (230) with a first 45-degree polarization rotation as a retarded illumination beam (30), the retarded illumination beam (30) illuminates the external image object (900), the external image object (900) generates multiple reflected beams (40) upon illumination of the retarded illumination beam (30), at least one of the multiple reflected beams (40) transits through the quarter wave retarded panel (230) with a second 45-degree polarization rotation as a retarded reflection beam (50) having opposite polarization to the first polarization, the retarded reflection beam (50) is either reflected by or transits through the first polarization beam splitter panel (210), and at least one of the plurality of first detectors (310) in the first imaging block (300) receives and detects radiation of the retarded reflection beam (50).

2. The LIDAR imaging system (90) according to claim 1, wherein the polarized illumination beam (20) confronts in an approximately 45 degree angle and to transmit through the polarized beam splitter panel (210) and then confronts the quarter wave retarder panel (230) in an approximately 90 degree angle.

3. The LIDAR imaging system (90) according to claim 1, wherein the polarized illumination beam (20) confronts in an approximately 45 degree angle and reflected by the polarized beam splitter panel (210) and then confronts the quarter wave retarder panel (230) in an approximate 90 degree angle.

4. The LIDAR imaging system (90) according to claim 1, wherein each of the at least one illumination source (110) includes an illumination beam catheter (115) and a light generator (116), wherein the illumination beam catheter (115) is an optical fiber (115) optically connected with the radiation generator (116).

5. The LIDAR imaging system (90) according to claim 1, wherein each of the at least one illumination source (110) includes an illumination beam collimator (120) configured to collimate the polarized illumination beam (20).

6. The LIDAR imaging system (90) according to claim 1, wherein the illumination source block (100) includes an illumination polarizer panel (130) positioned between the optical engine core (200) and the at least one illumination source (110), the illumination polarizer panel (130) configured to polarize illumination beams generated from the at least one illumination source (110) as the polarized illumination beams (20) with the first polarization.

7. The LIDAR imaging system (90) according to claim 1, further comprising a first focus lens set (810) configured between the quarter wave retarder panel (230) and the external image object (900), wherein the multiple reflected beams (40) are refracted by the first focus lens (810) and confront the quarter wave retarded panel (230) in an approximate 90 degree angle.

8. The LIDAR imaging system (90) according to claim 7, further comprising a plurality of second radiation waveguides (830) positioned between the external image object (900) and the first focus lens set (810), wherein each of the plurality of second waveguides (830) is in parallel with and configured to transmit a single retarded illumination beam (30).

9. The LIDAR imaging system (90) according to claim 1, wherein each of the multiple reflected beams (40) comprises a primary reflection beam (40i) defined as one with highest intensity of reflection and a plurality of secondary reflection beams (40j) defined as ones with relatively lower intensity of reflection.

10. The LIDAR imaging system (90) according to claim 1, wherein the first detectors (310) are semiconductor photodiodes.

11. The LIDAR imaging system (90) according to claim 10, wherein the semiconductor photodiodes are avalanche photodiodes.

12. The LIDAR imaging system (90) according to claim 1, wherein the first detectors (310) are grating diodes.

13. The LIDAR imaging system (90) according to claim 1, further comprising a first polarization filter panel (330) configured between the first imaging block (300) and the optical engine core (200), wherein the first polarization filter panel (330) substantially blocks transmission of radiation of the first polarization with wavelengths in the first wave length range (21).

14. The LIDAR imaging system (90) according to claim 1, wherein the optical engine core (200) further comprises a second polarized beam splitter panel (220), wherein the second polarized beam splitter panel (220) has opposite polarization to the first polarization with wavelengths in the first wave length range (21) and is spatially configured perpendicular to the first polarized beam splitter panel (210).

15. The LIDAR imaging system (90) according to claim 14, further comprising a second imaging block (400) having a plurality of second detectors (410), wherein the second imaging block (400) receives and detects secondary radiation (80) originated of wavelengths in a second wave length range (22) from the external image object (900) and transmitted through the first polarized beam splitter panel (210) and the second polarized beam splitter panel (220), wherein the first wave range (21) and the second wave length range (22) have no overlap over an electromagnetic spectrum.

16. The LIDAR imaging system (90) according to claim 15, further comprising a band pass filter penal (430) configured between the optical engine core (200) and the second imaging block (400), wherein the band pass filter panel (430) substantially blocks electromagnetic radiation of wavelengths outside the second wave length range (22).

17. The LIDAR imaging system (90) according to claim 15, further comprising a second focus lens (820) configured between the optical engine core (200) and the second imaging block (400), wherein the secondary radiation (80) is refracted by the second focus lens (820) and is guided towards the second detectors (410).

18. The LIDAR imaging system (90) according to claim 15, wherein the second imaging block (400) comprises a visible light image sensor configured to detect visible light and synchronously capture a two-dimensional image of the external image object (900).

19. The LIDAR imaging system (90) according to claim 15, wherein the first wave length range (21) is outside a visible portion of the electromagnetic spectrum and the second wave length range (22) is the visible portion of the electromagnetic spectrum.

20. The LIDAR imaging system (90) according to claim 19, wherein the first wave length range (21) is either in an ultra violet range of electromagnetic radiation with wavelength shorter than 280 nm but longer than 1 nm, or in a near infra-red range with wavelengths between 750 nm to 2500 nm.

21. The LIDAR imaging system (90) according to claim 1, wherein the illumination source block (100) further comprises a rocking plate (140) and a curved source prism (160), wherein the at least one illumination source (110) is mounted onto the rocking plate (140), the rocking plate (140) is driven to rock rotate the at least one illumination source (110) around a rocking axis (145) to swing the illumination beam (20), the illumination beam 20 is being refracted by the source prism 160, the illumination beam (20) upon refraction thereof confronts the first polarization beam splitter panel (210) in an approximate 45 degree angle.

22. The LIDAR imaging system (90) according to claim 1, further comprising a plurality of first radiation waveguides (250) configured between the external image object (900) and the quarter wave retarder panel (230), wherein each of the plurality of first radiation waveguides (250) is configured parallel to and transmits a single polarized illumination beam (30).

23. The LIDAR imaging system (90) according to claim 1, further comprising a plurality of third radiation waveguides (350) each positioned in correspondence with one of the first detectors (310) to block incident radiation which is not perpendicular to the first detectors (310).

* * * * *